US008347698B2

(12) United States Patent
Schleif et al.

(10) Patent No.: US 8,347,698 B2
(45) Date of Patent: Jan. 8, 2013

(54) SENSOR WITH G-LOAD ABSORBING SHOULDER

(75) Inventors: Kurt Kramer Schleif, Greenville, SC (US); Philip Michael Caruso, Simpsonville, SC (US); Seung-Woo Choi, Greer, SC (US); Robert David Jones, Simpsonville, SC (US); Jong Youn Pak, Oakland Township, MI (US)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 12/909,464

(22) Filed: Oct. 21, 2010

(65) Prior Publication Data

US 2012/0096933 A1 Apr. 26, 2012

(51) Int. Cl.
*G01M 15/14* (2006.01)

(52) U.S. Cl. .................................................... 73/112.01

(58) Field of Classification Search ............... 73/112.01, 73/112.03, 112.05, 112.06
See application file for complete search history.

(56) References Cited

U.S. PATENT DOCUMENTS

| | | | |
|---|---|---|---|
| 4,399,696 A | 8/1983 | Feller | |
| 4,518,917 A * | 5/1985 | Oates et al. | 324/207.25 |
| 4,649,756 A | 3/1987 | Feller | |
| 4,970,670 A * | 11/1990 | Twerdochlib | 702/99 |
| 5,479,818 A * | 1/1996 | Walter et al. | 73/112.05 |
| 5,594,665 A * | 1/1997 | Walter et al. | 700/301 |
| 7,160,083 B2 | 1/2007 | Pierce et al. | |
| 7,368,827 B2 * | 5/2008 | Kulkarni et al. | 290/52 |
| 7,572,524 B2 * | 8/2009 | Sabol et al. | 428/701 |
| 7,761,256 B2 | 7/2010 | Studer et al. | |
| 8,220,319 B2 * | 7/2012 | Schleif et al. | 73/112.01 |
| 2005/0044958 A1 * | 3/2005 | Chowdhury | 73/714 |
| 2008/0204707 A1 | 8/2008 | Hwang et al. | |
| 2010/0117859 A1 * | 5/2010 | Mitchell et al. | 340/870.16 |

* cited by examiner

*Primary Examiner* — Freddie Kirkland, III
(74) *Attorney, Agent, or Firm* — Cantor Colburn LLP

(57) ABSTRACT

A sensor is provided and includes a body disposed at a point of measurement interest on a rotor at a radial distance from a centerline thereof and having a substantially cylindrical shape and first and second opposing ends and a sensing end coupled to one of the first and second opposing ends, the other of the first and second opposing ends being coupled to a communication system, the sensing end including a sensing device configured to generate a signal reflective of a detected condition at the point of measurement interest, and at least one of the first and the second opposing ends being formed to define a shoulder portion for absorbing gravitational loading.

17 Claims, 19 Drawing Sheets

SENSOR WITH G-LOAD ABSORBING SHOULDER

CROSS-REFERENCE TO RELATED APPLICATIONS

This application is related to and cross-referenced with the co-pending US patent applications filed concurrently herewith and entitled "Sensor Packaging For Turbine Engine," "Communication System For Turbine Engine," and "Probe Holder For Turbine Engine Sensor," the entire contents of each of which are incorporated herein by reference.

BACKGROUND OF THE INVENTION

The subject matter disclosed herein relates to turbine engine sensors and, more particularly, to turbine engine sensors disposed on a rotor at a radial distance from the rotor centerline.

In a turbine engine, high temperature fluids are directed through a turbine section where they interact with turbine buckets, which are rotatable about a rotor, to generate mechanical energy. The environment within the turbine section and around or on the rotor is, therefore, characterized by relatively high gravitational loads (g-loads), high temperatures and high pressures. It is often advantageous to obtain measurements of those temperatures and pressures in order to ascertain whether the turbine is operating within normal parameters.

Attempts to measure pressures generally focus on pressure measurements on the rotor but require that the pressure sensor be packaged at or near the rotor centerline where g-loads are reduced. Typically, a wave-guide (tube) is routed from the pressure sensor to the measurement point of measurement interest. Routing a rigid, yet bendable tube through a series of slots and holes in the rotor, however, can be difficult and may often result in a leak or a broken connection. Also, use of a wave-guide restricts pressure measurement to static measurements only as dynamic pressures cannot be measured using a wave-guide due to the large volume of air between the sensor and measurement point. This large volume of air effectively dampens the pressure wave.

BRIEF DESCRIPTION OF THE INVENTION

According to an aspect of the invention, a sensor is provided and includes a body disposed at a point of measurement interest on a rotor at a radial distance from a centerline thereof and having a substantially cylindrical shape and first and second opposing ends and a sensing end coupled to one of the first and second opposing ends, the other of the first and second opposing ends being coupled to a communication system, the sensing end including a sensing device configured to generate a signal reflective of a detected condition at the point of measurement interest, and at least one of the first and the second opposing ends being formed to define a shoulder portion for absorbing gravitational loading.

According to another aspect of the invention, a sensor is provided and includes a body disposed at a point of measurement interest on a rotor at a radial distance from a centerline thereof and having a substantially cylindrical shape and first and second opposing ends and a sensing end coupled to one of the first and second opposing ends, the other of the first and second opposing ends being coupled to a communication system, the sensing end including a pressure sensor configured to generate a signal reflective of static and/or dynamic pressures at the point of measurement interest, and at least one of the first and the second opposing ends being formed to define a shoulder portion for absorbing gravitational loading.

According to another aspect of the invention, a pressure sensor is provided and includes a body disposed at a point of measurement interest on a rotor at a radial distance from a centerline thereof and having a substantially cylindrical shape and first and second opposing ends and a sensing end coupled to one of the first and second opposing ends, the other of the first and second opposing ends being coupled to a communication system, the sensing end including a sensing device configured to generate a signal reflective of detected static and/or dynamic pressures applied thereto, and at least one of the first and the second opposing ends being formed to define a shoulder portion for absorbing gravitational loading associated with rotor rotation about the centerline.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects of the invention, a sensor that is capable of measuring static and/or dynamic pressure content at a point of interest of a rotor of a turbine is provided. The point of interest (or measurement location) is a harsh environment and the sensor is exposed to high g-loads and extreme temperatures. The sensor and the associated electrical lead wiring are each strategically oriented and secured in a probe holder that ensures that the sensor can withstand the extreme centrifugal loading of a spinning rotor. Each point of interest requires a unique probe holder design and lead wire routing strategy. The interfaces of the probe holder to the host rotor component are engineered to transfer the gravitational load and to account for stress concentrations.

Each probe holder packages the sensor on the rotor at the point at which data is desired to be taken such that a particular, high-strength surface of the sensor is in contact with a load bearing surface of the probe holder. This arrangement permits the sensor to be rotated at extremely high g-loads. The sensor may additionally be held in place by an elastic element, such as a spring. The spring holds the sensor in position during rotor spin-up until the sensor is held in place by centrifugal loading. The probe holder also secures the lead wire(s) to provide strain relief and prevent short circuits or separation.

In accordance with aspects, the ability to obtain static and/or dynamic pressure readings on a rotor allows design engineers to evaluate the flow of air in and around the rotor. In particular, rotating sensors allow engineers to validate the flow of vital cooling air through circuits within the rotor. Such data enables engineers to better evaluate their designs and ensure adequate cooling air reaches air-cooled hardware in the turbine section. Rotating pressure data could potentially extend the life of the gas turbine. Rotating sensors also allow engineers to measure acoustic phenomena within the rotor. Certain acoustic phenomena occur deep within the rotor and cannot be measured by sensors located on the stator.

Figure 1:
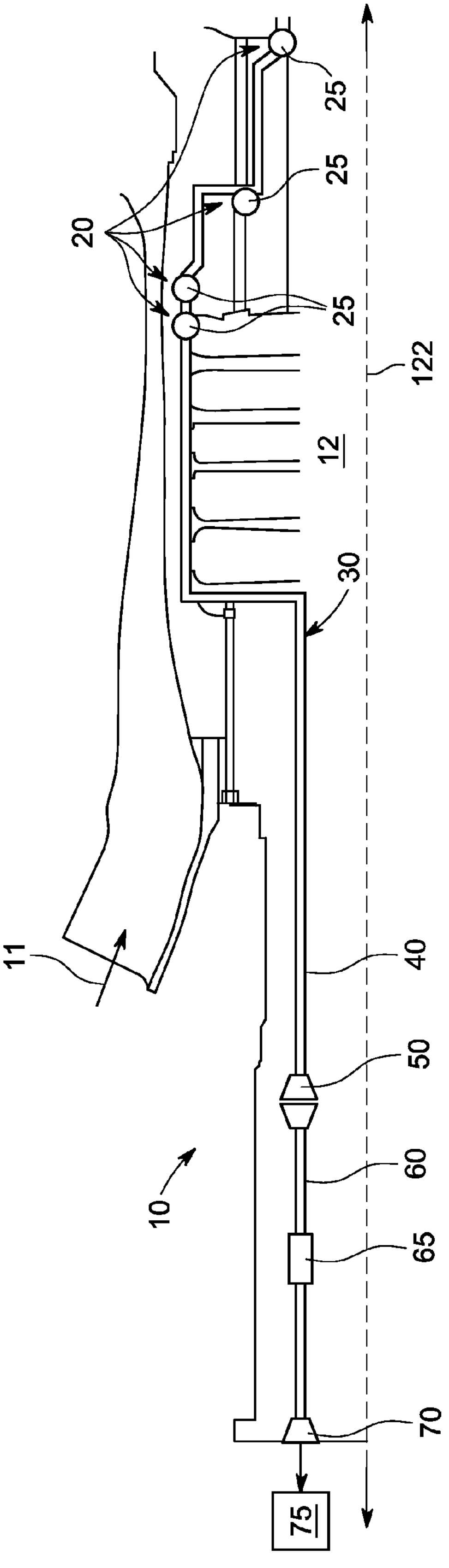
FIG. 1 is a side view of a turbine engine.
Figure 2:
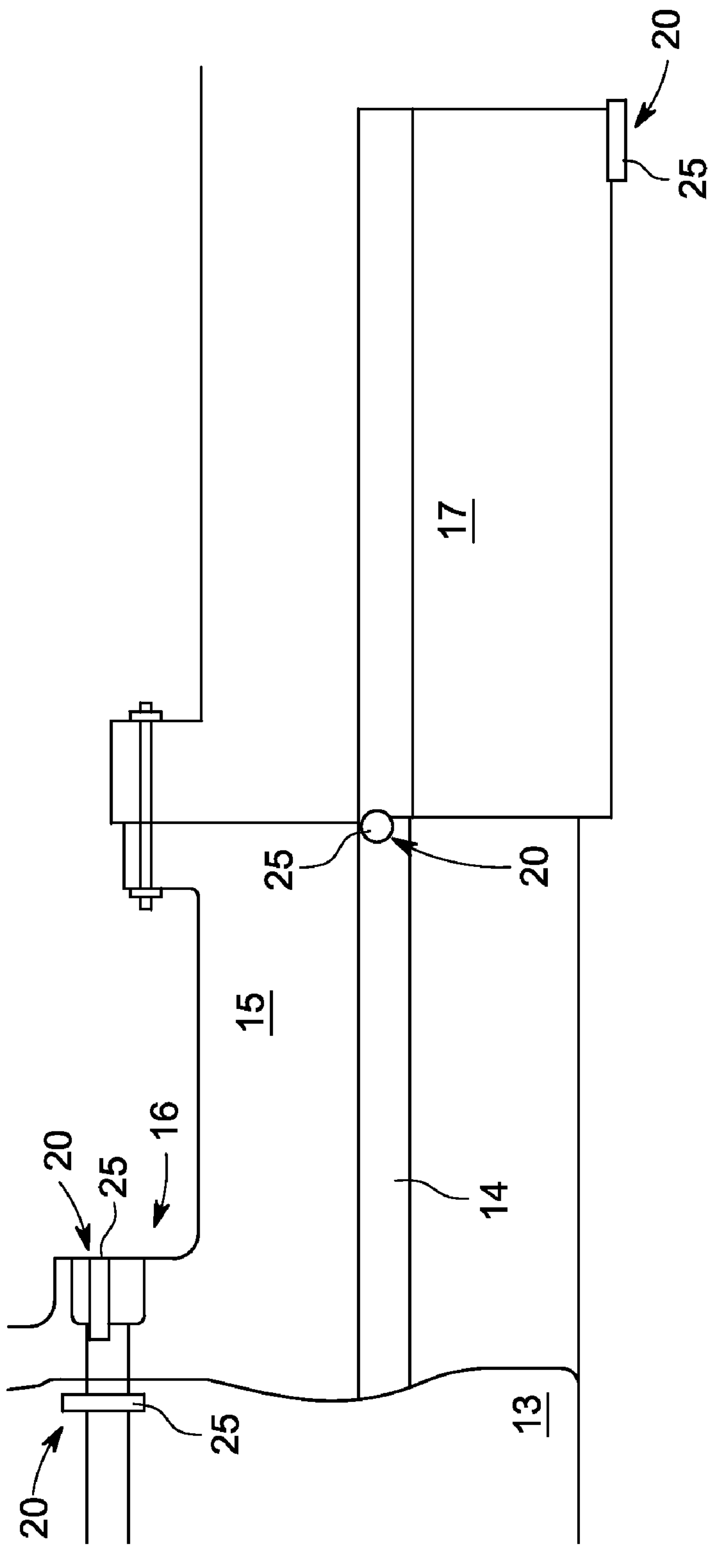
FIG. 2 is a schematic view of points of measurement interest of the turbine engine of FIG. 1.

With reference to FIGS. 1 and 2, a turbine engine 10, such as a gas or steam turbine engine, is provided. The turbine engine 10 includes a turbine section 11, in which mechanical energy is derived from a flow of high energy fluids, and a rotor 12, which is rotatable about a centerline 122. The turbine engine 10 further includes sensors 25 to measure, for example, static and/or dynamic pressures at points of measurement interest 20 defined on the rotor 12 at a radial distance from the centerline 122. The turbine engine 10 further includes a communication system 30 and probe holders 90, 110, 130 and 140 (see FIGS. 7, 13, 20 and 24, respectively) for each sensor 25. The communication system 30 may be a wired or wireless system and permits static and/or dynamic pressure sensor signals to be transmitted from the sensors 25 to a non-rotating recording system 75 via for example a slip ring, a telemetry system or any other suitable transmitting device used to transmit rotating signals. The probe holders 90, 110, 130 and 140 secure the sensors 25 and portions of the communication system 30 on the rotor 12 proximate to each of the points of measurement interest 20.

In accordance with embodiments, the points of measurement interest 20 may be located at various locations relative to various components of the turbine engine 10. These include an extraction cavity formed perimetrically around the centerline 122 by an outer radial portion of a body of a forward shaft 13 and at an exit of a cooling air hole 14 defined to extend axially through a middle shaft 15. The locations may also include a region near a forward flange 16 of the middle shaft 15 and at a region near an aft shaft plug 17. For the point of measurement interest 20 at the extraction cavity, a longitudinal axis of the sensor 25 is substantially parallel with a radial dimension of the rotor 12, for the point of measurement interest 20 at the cooling air hole 14 exit, the longitudinal axis of the sensor 25 is substantially parallel with a circumferential dimension of the rotor 12 and for the respective points of measurement interest 20 near the forward flange 16 and the aft shaft plug 17, the longitudinal axis of the sensor 25 is substantially parallel with an axial dimension of the rotor 12. In each case, the sensors 25 are exposed to both static and/or dynamic pressures as the rotor 12 rotates about the centerline 122.

Figure 3:
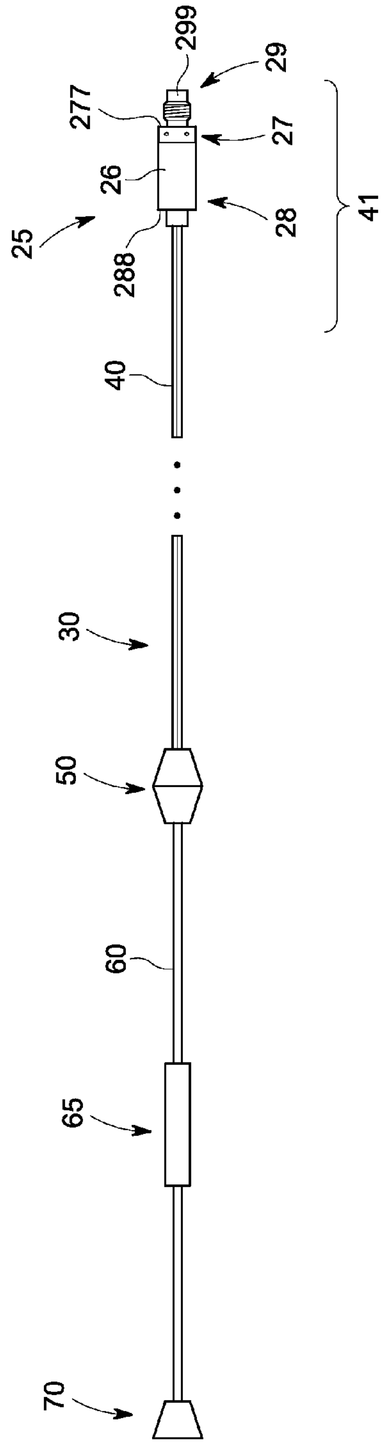
FIG. 3 is a schematic illustration of a pressure sensor and wiring.
Figure 4:
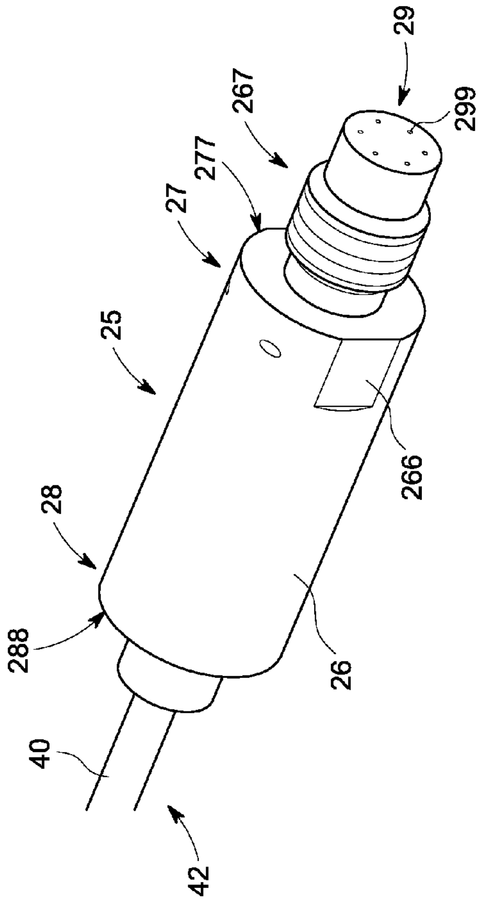
FIG. 4 is a perspective view of the pressure sensor.

With reference to FIGS. 3 and 4, each sensor 25 includes a body 26 having a substantially cylindrical shape and first and second opposing ends 27 and 28. A sensing end 29 is coupled to and protrudes longitudinally from respective faces of one of the first and second opposing ends 27 or 28 with the other coupled to the first wiring section 40 of the communication system 30. The first and the second opposing ends 27 and 28 are formed to define a shoulder portion 277 and 288, respectively, for absorbing gravitational loading. The shoulder portions 277 and 288 are defined at the respective faces of the first and second opposing ends 27 and 28 remote from the sensing end 29 and the coupling to the first wiring section 40. The body 26 may also be formed to define flats 266, such as wrench flats, for calibration and the sensing end 29 may be formed with threading 267.

The sensing end 29 may include a sensing device 299, which is configured to generate an electrical signal that is reflective of detected static and/or dynamic pressures applied thereto. When static pressure is applied to the sensing device 299, the sensing device 299 generates a direct current (DC) electrical signal with a magnitude that is reflective of the static pressure. When dynamic pressure is applied to the sensing device 299, the sensing device 299 generates an alternating current (AC) electrical signal on top of the DC electrical signal with a magnitude that is reflective of the dynamic pressure. The sensing device 299 may include a piezoresistive element or a similar type of device.

In accordance with aspects of the invention, a system for communications is provided and includes the sensors 25 to measure static and/or dynamic pressures at the points of measurement interest defined on the rotor 12 at a radial distance from the centerline 122 about which the rotor 12 is rotatable and the communication system 30. For purposes of clarity and brevity, the system will be described with regard to one sensor 25 for use at one point of measurement interest 20. The communication system 30 may operate via wiring or via wireless devices. Where the communication system 30 is wired, it is disposed on the rotor 12 at a radial distance from the centerline 122 and includes the first wiring section 40, such as a lead wire, which is coupled to the sensor 25 at a lead section 41. The communication system 30 further includes a second wiring section 60 and a first connection 50 by which the first and second wiring sections 40 and 60 are connectable.

The first wiring section 40 may be formed of, e.g., two stainless steel high-temperature wires or similarly rugged wiring. The first wiring section 40 is formed to survive and withstand the gravitational loading, the high temperatures and the high pressures present within the turbine engine 10.

The first connection 50 may include hermetic connectors or similar devices, such that the high temperatures and pressures within the turbine engine 10 can be sealed therein.

The system may further include a temperature compensation module 65 disposed along the second wiring section 60 and a second connection 70. The temperature compensation module 65 adjusts the electrical signal generated by the sensing device 299 and would normally be placed along the first wiring section 40 on the other side of the first connection 50. However, since the points of measurement interest 20 are located at regions of particularly high temperatures and pressures, moving the temperature compensation module to the second wiring section 60 provides for a more accurate temperature compensation operation than would otherwise be available from a temperature compensation module exposed to turbine conditions. The second connection 70 permits the second wiring section 60, which rotates about the centerline 122 with the rotor 12, to transmit a signal in accordance with the electric signals generated by the sensing device 299 and the temperature compensation module 65 to a non-rotating stationary recording system 75 or element via a slip ring, telemetry systems or any other suitable transmitting device.

Figure 5:
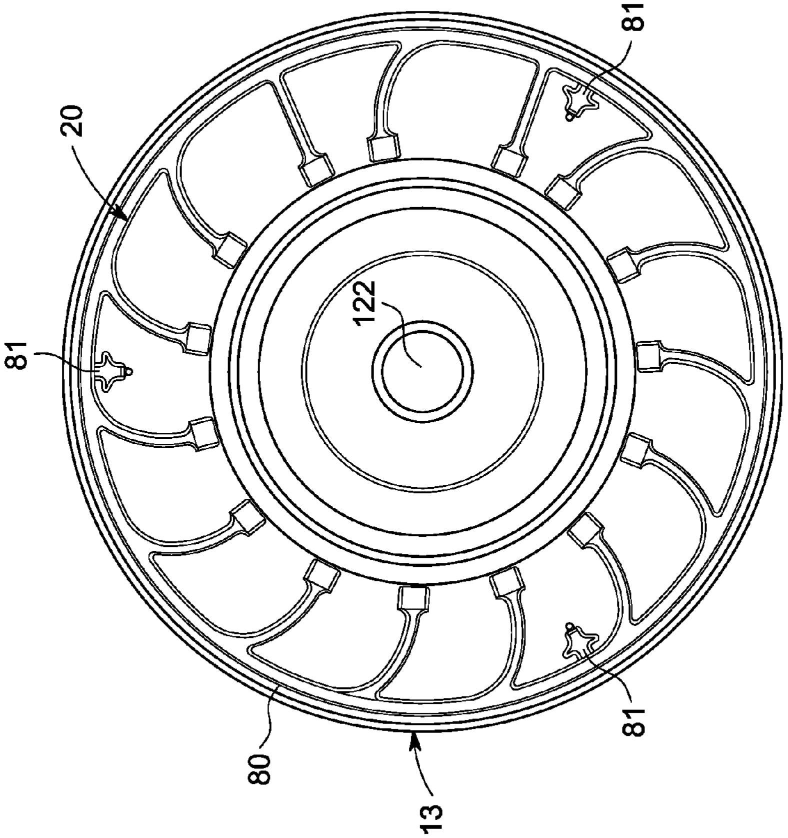
FIG. 5 is an axial view of a forward shaft body of the turbine engine of FIG. 1.
Figure 6:
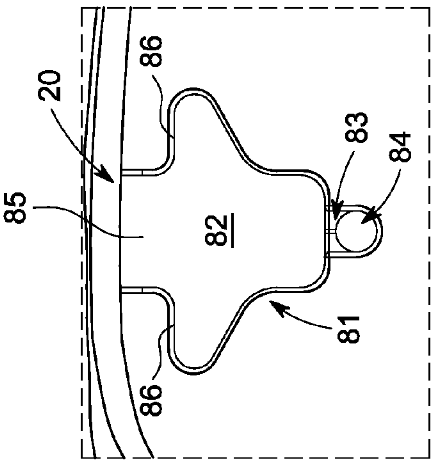
FIG. 6 is an enlarged view of a forward shaft cavity of the forward shaft body of FIG. 5.
Figure 8:
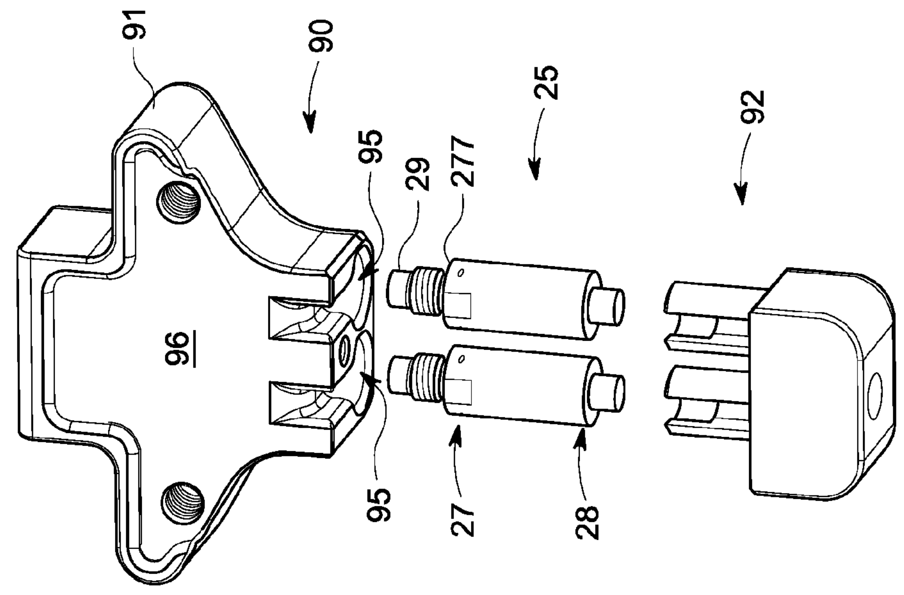
FIG. 8 is an exploded perspective view of the probe holder of FIG. 7.
Figure 7:
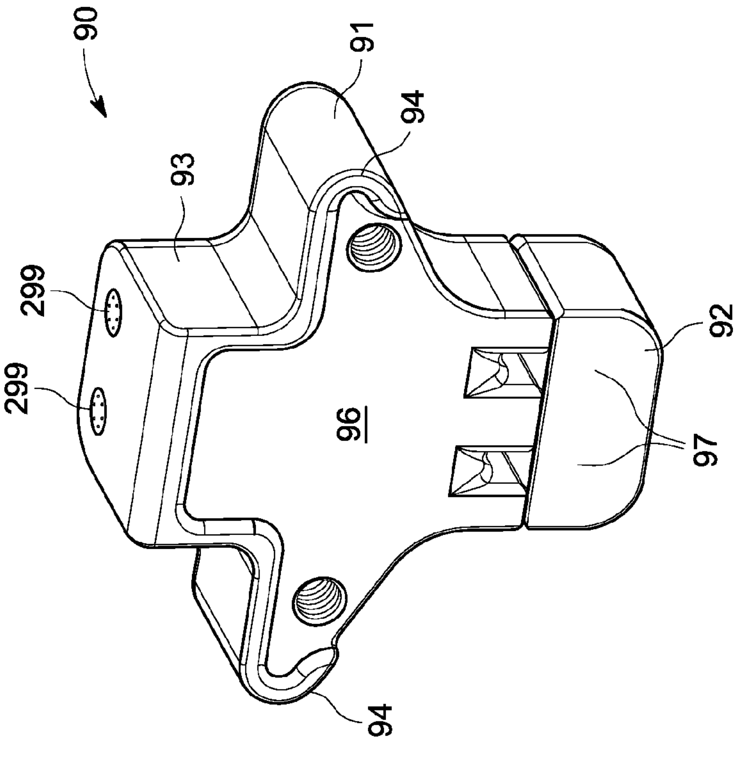
FIG. 7 is a perspective view of a probe holder.
Figure 9:
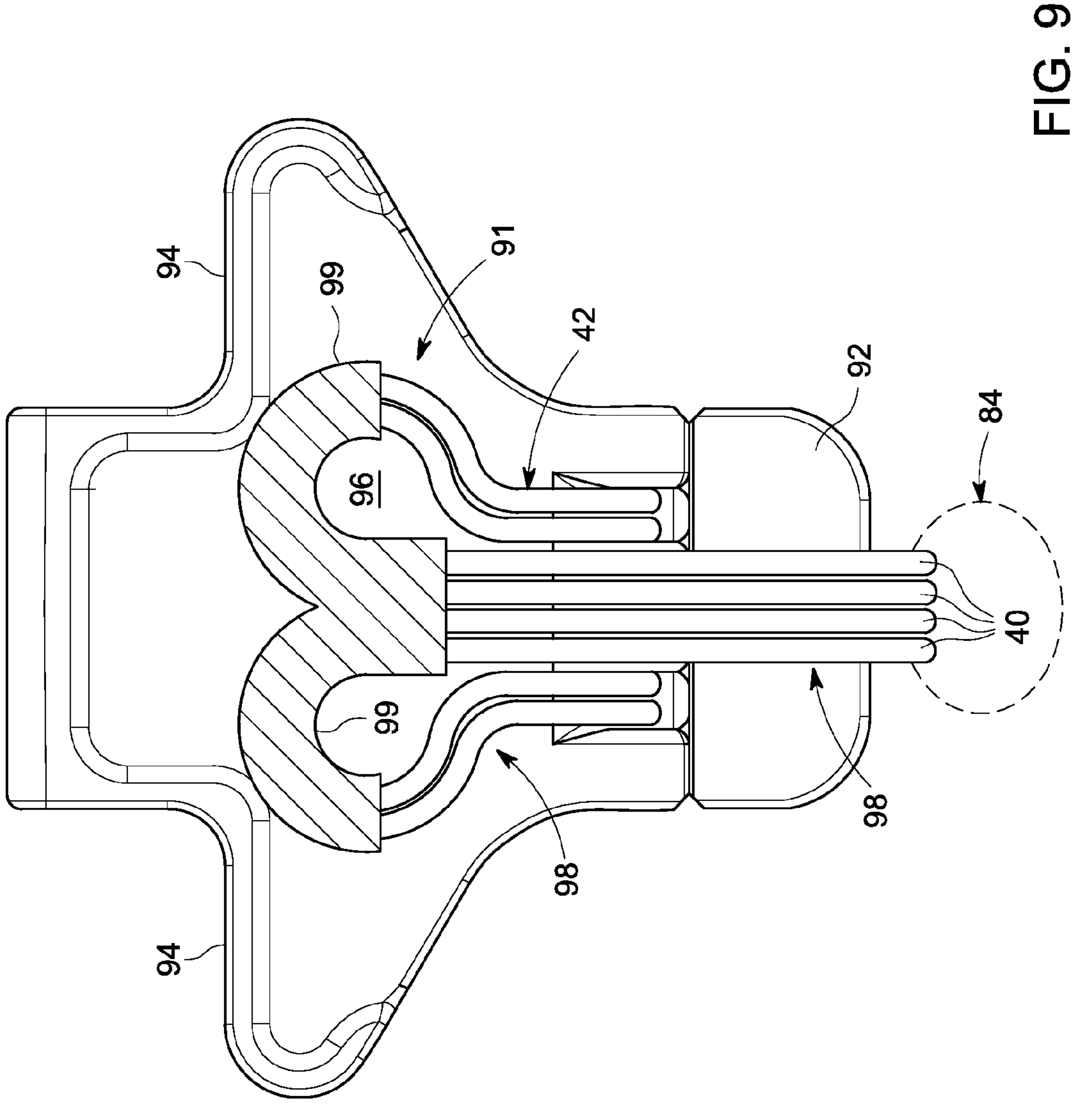
FIG. 9 is a plan view of the probe holder of FIG. 7 and a wiring assembly.
Figure 10:
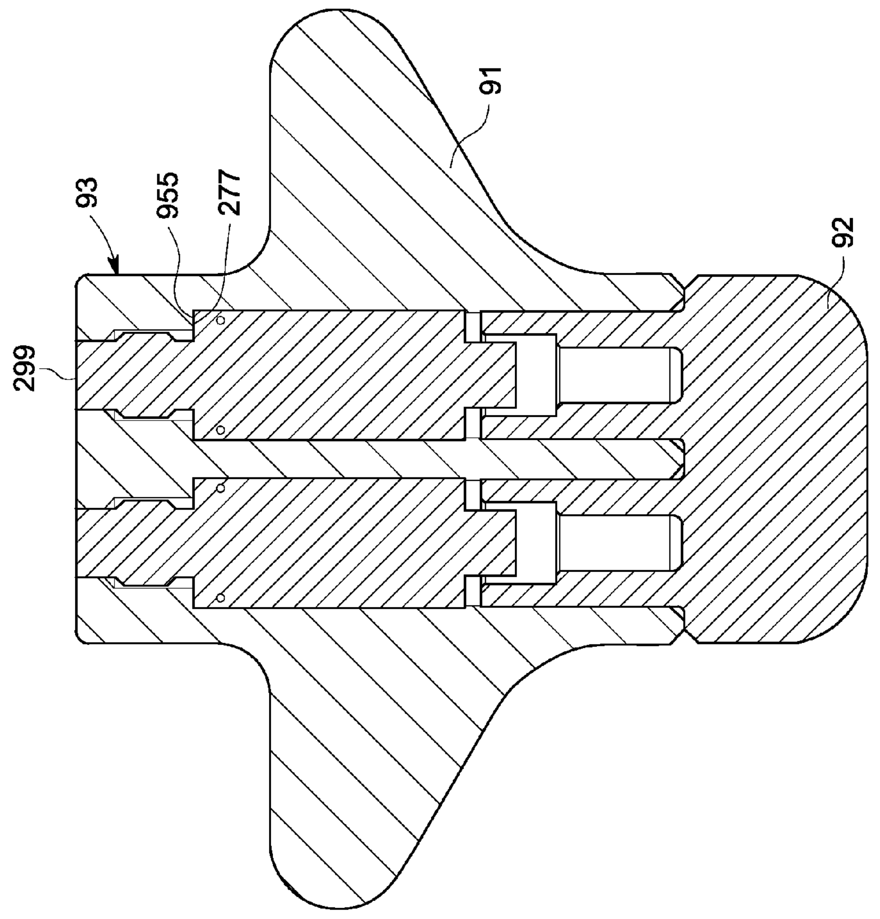
FIG. 10 is a plan view of an interior of the probe holder of FIG. 7.

With reference to FIGS. 5-10, one of the points of measurement interest 20 is located at the extraction cavity formed perimetrically around the centerline 122 by an outer radial portion of a forward shaft body 80 of the forward shaft 13. The extraction cavity is formed as an annular recess in the forward shaft body 80 from an aft facing surface thereof. As shown in FIGS. 5 and 6, a forward shaft cavity 81 is formed in the forward shaft body 80 at a location proximate to the extraction cavity and may be provided as multiple forward shaft cavities 81 that are spaced around the extraction cavity. Each forward shaft cavity 81 has a main cavity region 82 defined within the forward shaft body 80, a trench 83 and a lead wire hole 84. The main cavity region 82 includes a neck portion 85 that opens into the extraction cavity and shoulder abutment portions 86 that are relatively flat and widely extended from the neck portion 85. The lead wire hole 84 permits the first wiring section 40 to be threaded through the forward shaft body 80 in an axial direction from a forward side to the aft facing surface and the trench 83 permits the first wiring section 40 to be directed radially outwardly toward the main cavity region 82.

As shown in FIGS. 7-10, probe holder 90 is insertible into the forward shaft cavity 81 and is shaped substantially similarly to that of the main cavity region 82 although this is merely exemplary and not required as long as the probe holder 90 is otherwise securable therein and able to withstand and absorb high gravitational loading, high temperatures and high pressures associated with rotor 12 rotation. The probe holder 90 includes a probe holder body 91 and a cap 92. The probe holder body 91 fits within the main cavity region 81 and has a neck 93 that fits within the neck portion 85 and wings 94 that fit within the shoulder abutment portions 86. The abutment of the wings 94 with the shoulder abutment portions 86 absorbs gravitational loading.

The radially outward-most face of the neck 93 is substantially aligned with an inner diameter of the extraction cavity when the probe holder 90 is inserted into the forward shaft cavity 81. The probe holder body 91 is further formed to define sensor cavities 95 therein and into which for example two sensors 25 are insertible such that the longitudinal axis of each is aligned with a radial dimension of the rotor 12 and such that the sensing devices 299 align with the radially outward-most face of the neck 93 and the inner diameter of the extraction cavity. The cap 92 is attachable to the probe holder body 91 to secure the sensors 25 in this position at least until rotor 12 rotation begins. The sensor cavities 95 are further defined with sensor cavity shoulders 955 against which the shoulder portions 277 abut. As rotor 12 rotation begins, the abutment of the sensor cavity shoulders 955 with the shoulder portions 277 absorbs gravitational loading.

The probe holder body 91 is further formed to define a surface 96 and probe holder trenches 97. A portion 42 of the first wiring section 40 is securable to the surface 96 and threadable through the probe holder trenches 97 for connection with the sensors 25 such that the portion 42 is provided with strain relief. The strain relief is achieved by the portion 42 being provided with slack at sections 98 defined ahead of and behind a wiring assembly 99. The wiring assembly 99 may include thin foil strapping or a similar material that secures the portion 42 to the surface 96 without permitting relative movement of the wiring and the probe holder 90. The slack at sections 98 allows for strain to be applied to the wiring without risk of disconnections or similar failures during operation.

Figure 12:
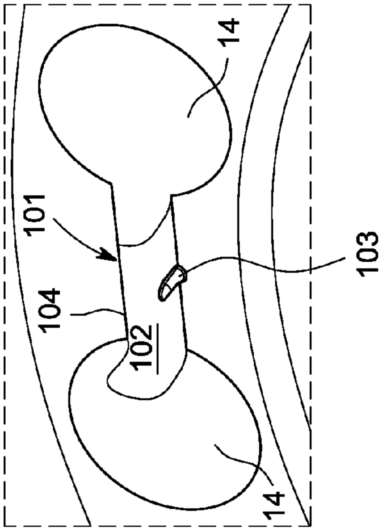
FIG. 12 is an enlarged view of exits of cooling air holes of the middle shaft of FIG. 11.
Figure 11:
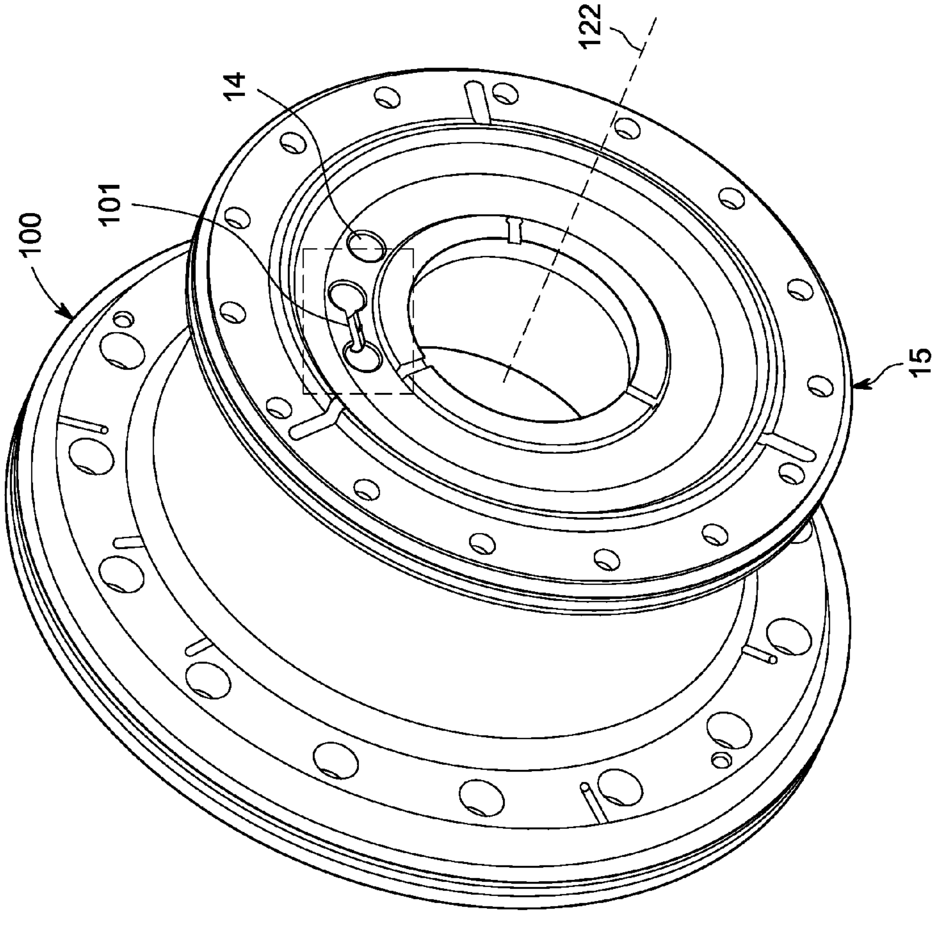
FIG. 11 is a perspective view of a middle shaft of the turbine engine of FIG. 1.

With reference to FIGS. 11-16, another point of measurement interest 20 is located at the exit of at least some of the cooling air holes 14 extending axially through a middle shaft body 100 to an aft facing surface thereof where multiple cooling air hole 14 exits are arrayed about the rotor centerline 122. As shown in FIG. 12, a first middle shaft cavity 101 is formed in the middle shaft body 100 at a location proximate to the cooling air hole 14 exit and may be provided as multiple first middle shaft cavities 101 spaced around the rotor centerline 122. Each middle shaft cavity 101 has a middle shaft cavity region 102 and a first complementary locking feature 103. The middle shaft cavity region 102 is substantially tubular, may extend between adjacent cooling air hole 14 exits and includes middle shaft shoulder abutment portions 104 that are relatively flat and widely extended along a length of the shaft cavity region 102.

Figure 13:
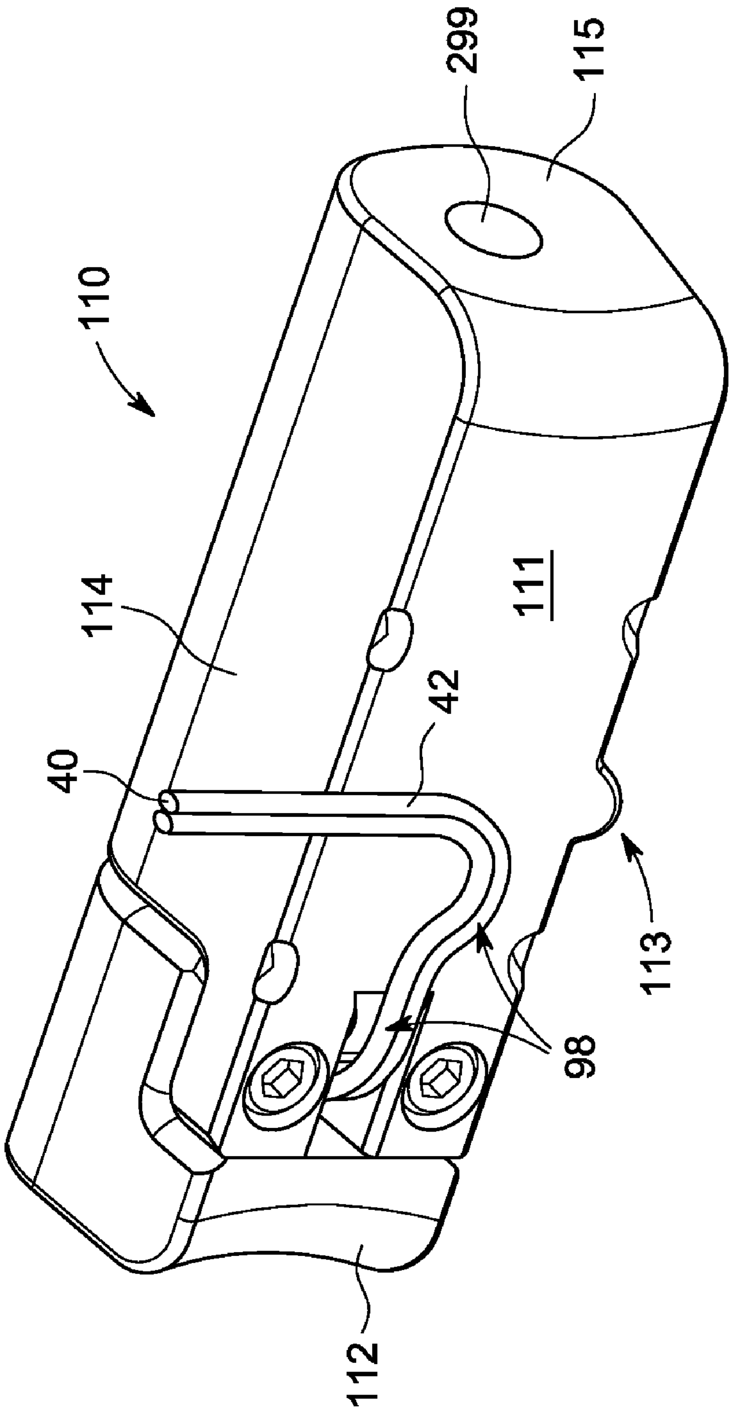
FIG. 13 is a perspective view of a probe holder.
Figure 14:
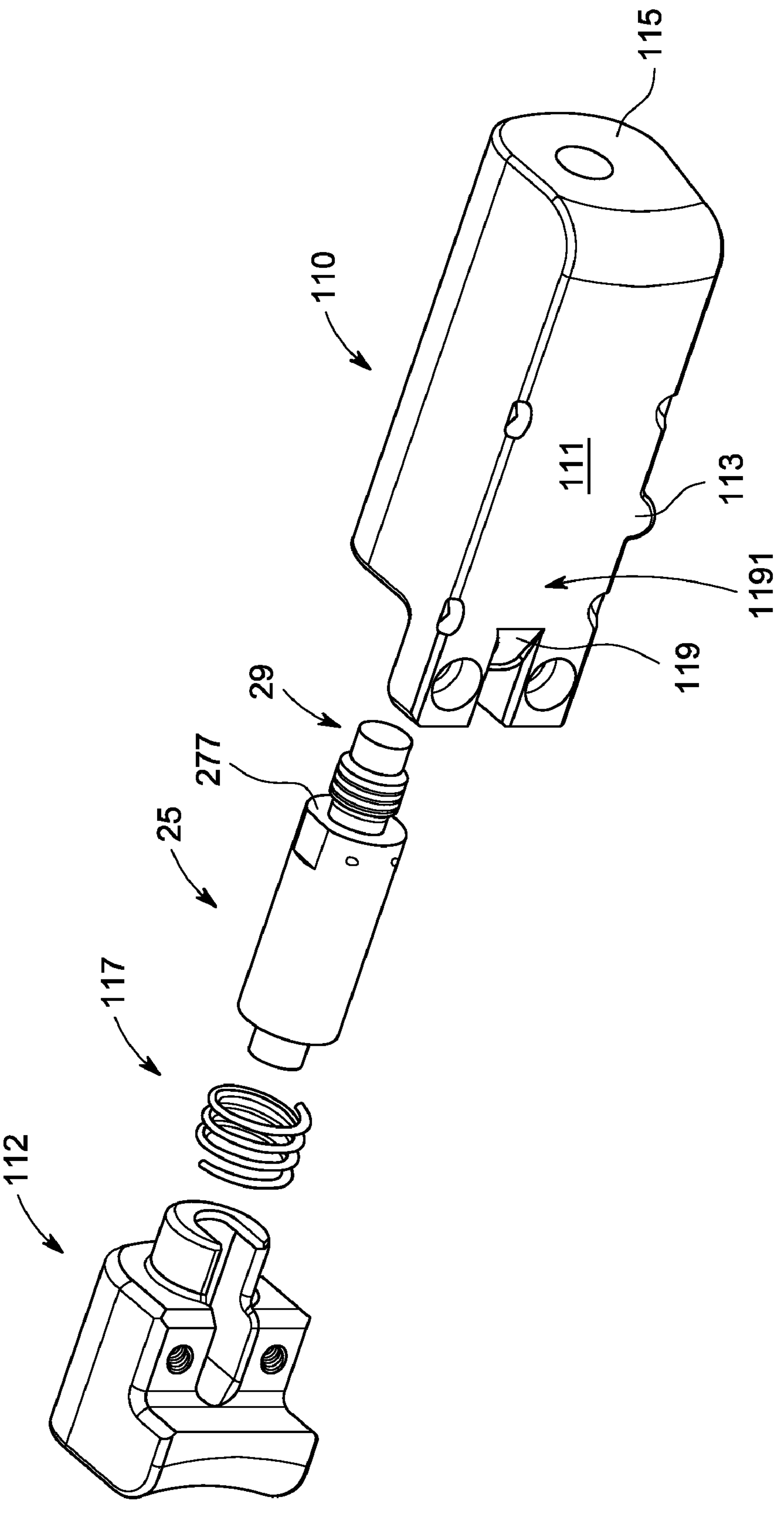
FIG. 14 is an exploded perspective view of the probe holder of FIG. 13.
Figure 15:
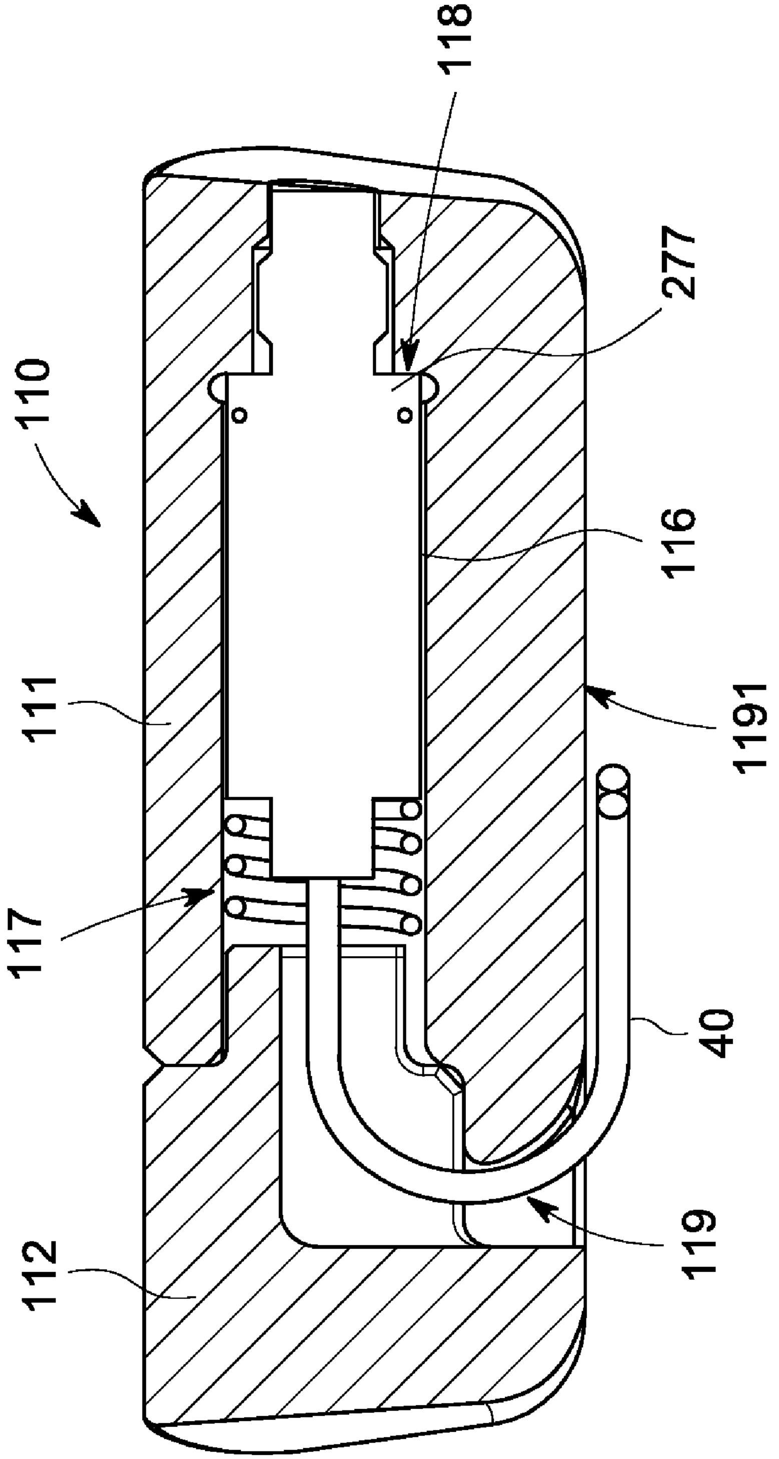
FIG. 15 is a plan view of an interior of the probe holder of FIG. 13.

As shown in FIGS. 13-15, probe holder 110 is insertible into and shaped substantially similarly to that of the middle shaft cavity region 102 although this is merely exemplary and not required as long as the probe holder 110 is otherwise securable therein and able to withstand high gravitational loading, high temperatures and high pressures associated with rotor 12 rotation. The probe holder 110 includes a probe holder body 111 and a cap 112. The probe holder body 111 fits within the middle shaft cavity region 101 and has a second complementary locking feature 113 that mates with the first locking feature 103 and a sidewall 114 that abuts the middle shaft shoulder abutments portions 104. The probe holder body 111 is secured by cooperation of the first and second complementary locking features 103 and 113 and the abutment of the sidewall 114 with the middle shaft shoulder abutment portions 104 absorbs gravitational loading. In addition, axial motion of the probe holder body 111 may be prevented by staking the aft facing surface of the middle shaft 15 in the vicinity of the probe holder body 111.

A face 115 of the probe holder body 111 may be substantially aligned with a curvature of an outer diameter of the cooling air hole 14 exit and a rear end of the cap 112 may be aligned with a curvature of the adjacent cooling air hole 14 exit. The probe holder body 111 is further formed to define a sensor cavity 116 therein and into which the sensor 25 is insertible such that the longitudinal axis thereof is aligned with a circumferential dimension of the rotor 12 and such that the sensing device 299 aligns with the face 115. The cap 112 is attachable to the probe holder body 111 and provides anchoring for elastic element 117, which may be a spring or coil. The elastic element 117 secures the sensor 25 in its circumferential position. The sensor cavity 116 is further defined with sensor cavity shoulders 118 against which the shoulder portion 277 abuts to absorb gravitational loading.

The probe holder body 111 is further formed to define middle shaft probe holder trenches 119 and a surface 1191. The portion 42 of the first wiring section 40 is securable to the surface 1191 and threadable through the middle shaft probe holder trenches 119 for connection with the sensor 25 such that the portion 42 is provided with strain relief. The strain relief is achieved by the portion 42 being provided with slack at sections 98 in a manner similar to the manner for providing strain relief as described above.

Figure 16:
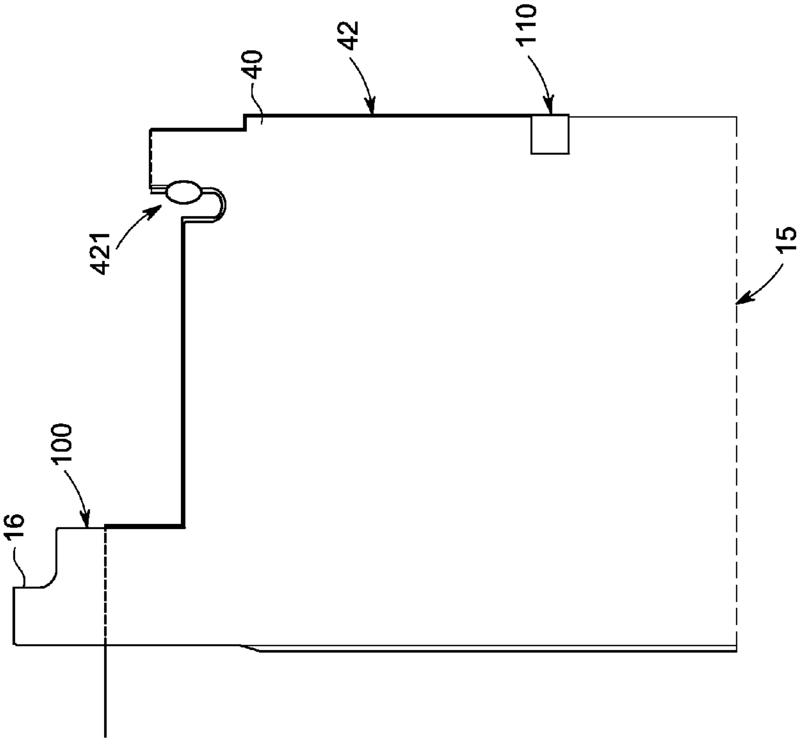
FIG. 16 is a side view of wiring around the middle shaft.

With reference to FIG. 16, the first wiring section 40 may be threaded radially outwardly along the aft face of the middle shaft 15 and then axially along an outer surface of the middle shaft 15 in the forward direction and through the forward flange 16 in the axial direction. The first wiring section 40 may be provided with a wire splice 421 along this route.

Figure 17:
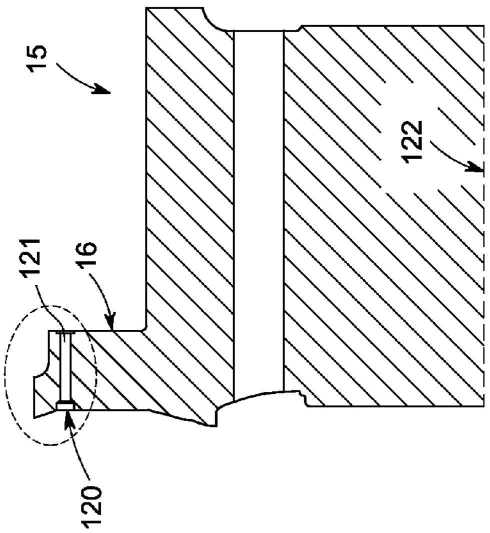
FIG. 17 is a side schematic view of the forward flange of the middle shaft of FIG. 11.

With reference to FIGS. 17-21, another point of measurement interest 20 is located at a region near the forward flange 16 of the middle shaft 15. The forward flange 16 is formed as an annular protrusion from a forward side of the middle shaft 15 and extends perimetrically around the centerline 122. As shown in FIG. 17, the forward flange 16 includes a forward flange body 120 through which a forward flange cavity 121 is defined and, in some cases, through which multiple forward flange cavities 121 are defined and spaced around the centerline 122. In various embodiments, the forward flange cavities 121 are uniformly and non-uniformly distributed about the centerline 122.

Figure 20:
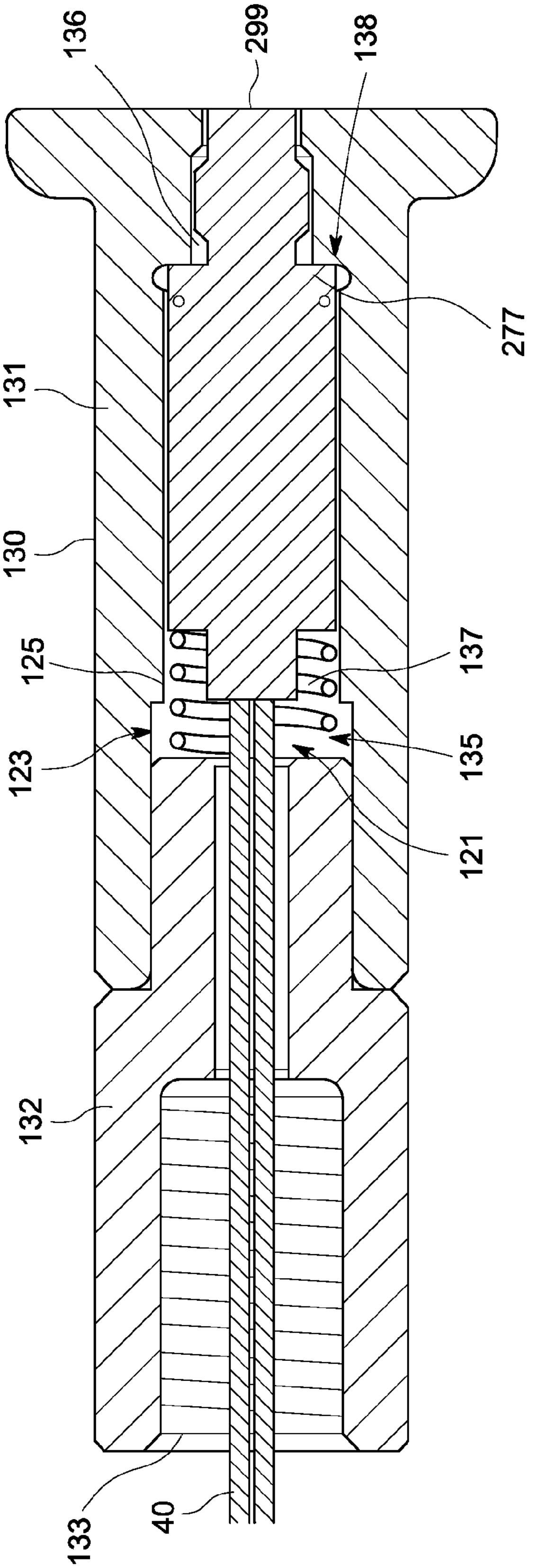
FIG. 20 is a side view of an interior of the probe holder of FIGS. 18 and 19.
Figure 21:
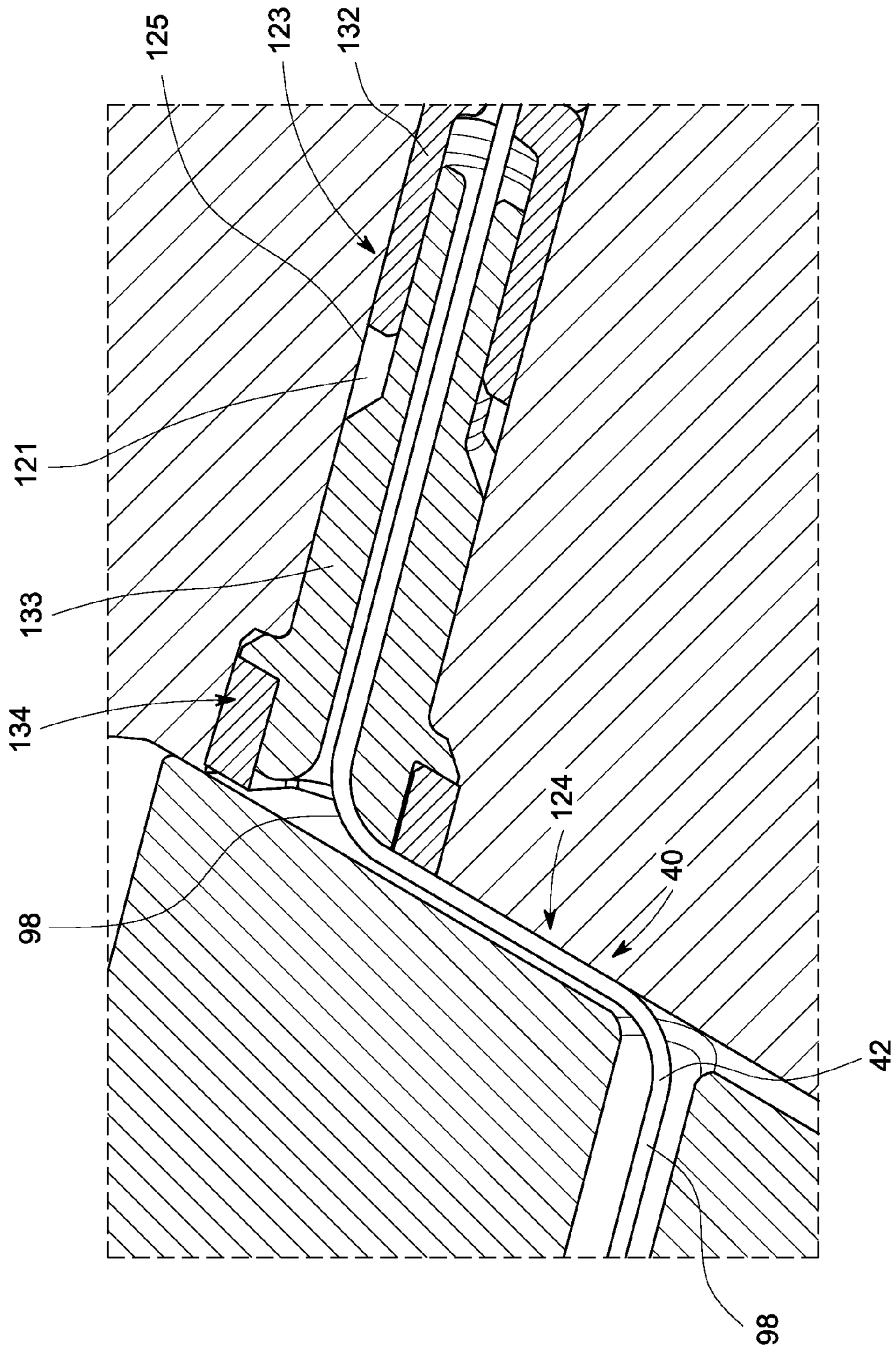
FIG. 21 is a perspective view of the probe holder of FIGS. 18 and 19 as installed within the forward flange of FIG. 17.

As shown in FIGS. 20 and 21, each forward flange cavity 121 has a forward flange cavity region 123 defined within the forward flange body 120 and a radial trench 124. The forward flange cavity region 123 is substantially tubular and may extend through the forward flange 16. As such, the forward flange cavity region 123 includes flange shoulder abutment portions 125 that extend along a length of the forward flange cavity region 123. The radial trench 124 permits the first wiring section 40 to be threaded to the forward face of the middle shaft 15, radially outwardly and then into the forward flange cavity region 123.

Figure 18:
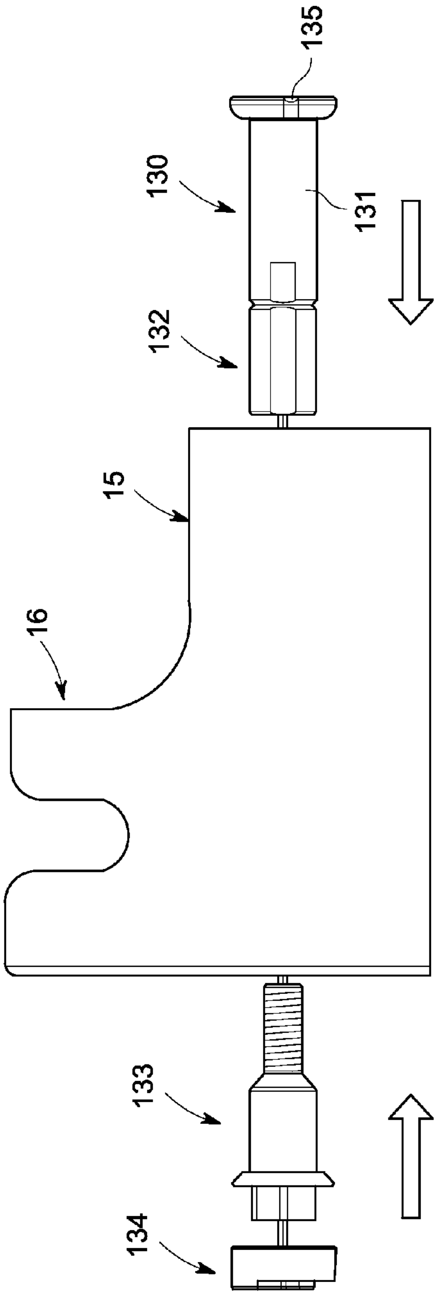
FIGS. 18 and 19 are exploded views of a probe holder for installation within the forward flange of FIG. 17.
Figure 19:
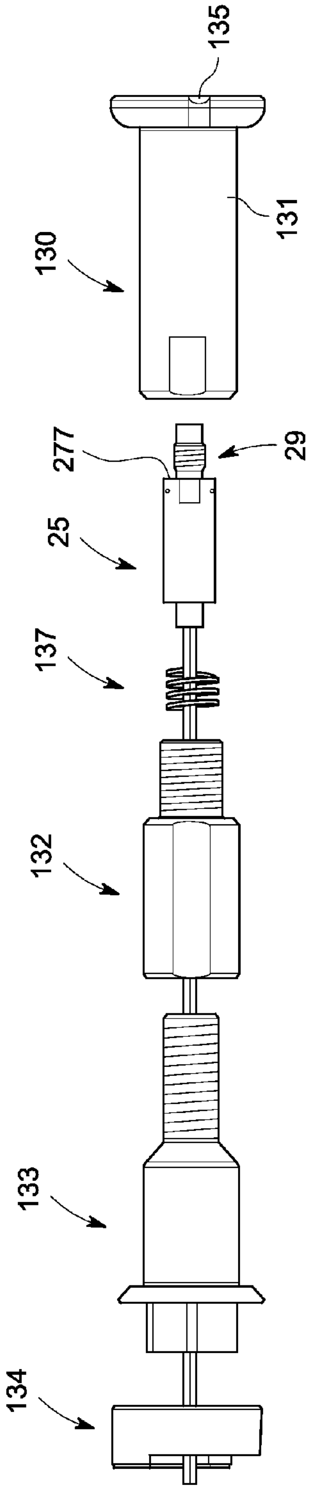

As shown in FIGS. 18 and 19, probe holder 130 is insertible into the forward flange cavity 121 from the aft direction and is shaped substantially similarly to that of the forward flange cavity region 123 although this is merely exemplary and not required as long as the probe holder 130 is otherwise securable therein and able to withstand high gravitational loading, high temperatures and high pressures associated with rotor 12 rotation. The probe holder 130 includes a probe holder body 131, a probe holder plug 132, a bolt 133 and a bridging ring 134. The probe holder body 131 further includes an anti-rotation feature 135 that prevents rotation thereof within the forward flange cavity region 123.

The probe holder body 131 is installed from the aft direction and forwardly through the forward flange cavity region 123 along with probe holder plug 132, which is insertible into the probe holder body 131. The bolt 133, which is securable to the probe holder plug 132 by, for example, threading and/or welding, is insertible in the rearward direction. The bridging ring 134 is then installed via slip fitting and/or welding into the forward flange cavity region 123 behind the bolt 133 to provide for a wiring pathway to the radial trench 123. As rotor 12 rotation occurs, the probe holder body 131 is secured by the abutment of probe holder body 131 and the anti-rotation feature 135, the probe holder plug 132, the bolt 133 and the bridging ring 134 with the flange shoulder abutment portions 125.

The axially rearward-most face of the probe holder body 131 is substantially aligned with a rearward-most face of the forward flange 16. The probe holder body 131 is further formed to define sensor cavities 136 therein and into which an elastic element 137, such as a compression spring, and the sensor 25 are insertible. The elastic element 137 may be anchored on the probe holder plug 132 and biases the sensor 25 such that the longitudinal axis of the sensor 25 is maintained in an alignment position with an axial dimension of the rotor 12 and such that the sensing device 299 is maintained in an alignment position with the axially rearward-most face of the probe holder body 131 and the rearward-most face of the forward flange 16. The sensor cavities 136 are further defined with sensor cavity shoulders 138 against which the shoulder portion 277 of the sensor 25 abuts.

With the first wiring section 40 threaded along the radial trench 124, a portion 42 of the first wiring section 40 is provided with strain relief at sections 98 in a manner similar to the manner of providing strain relief described above.

Figure 22:
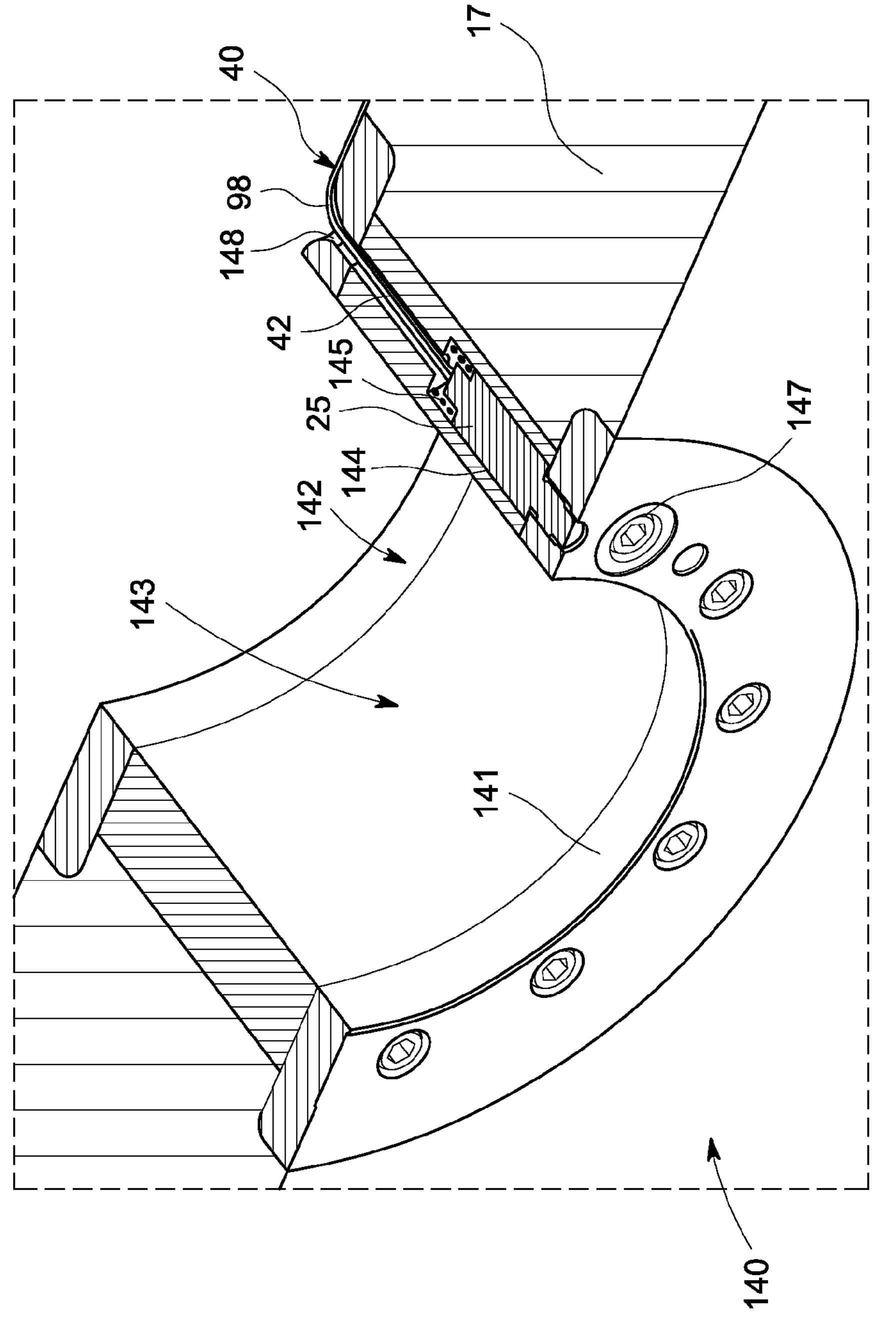
FIG. 22 is a perspective view of an aft shaft plug of the turbine engine of FIG. 1.
Figure 23:
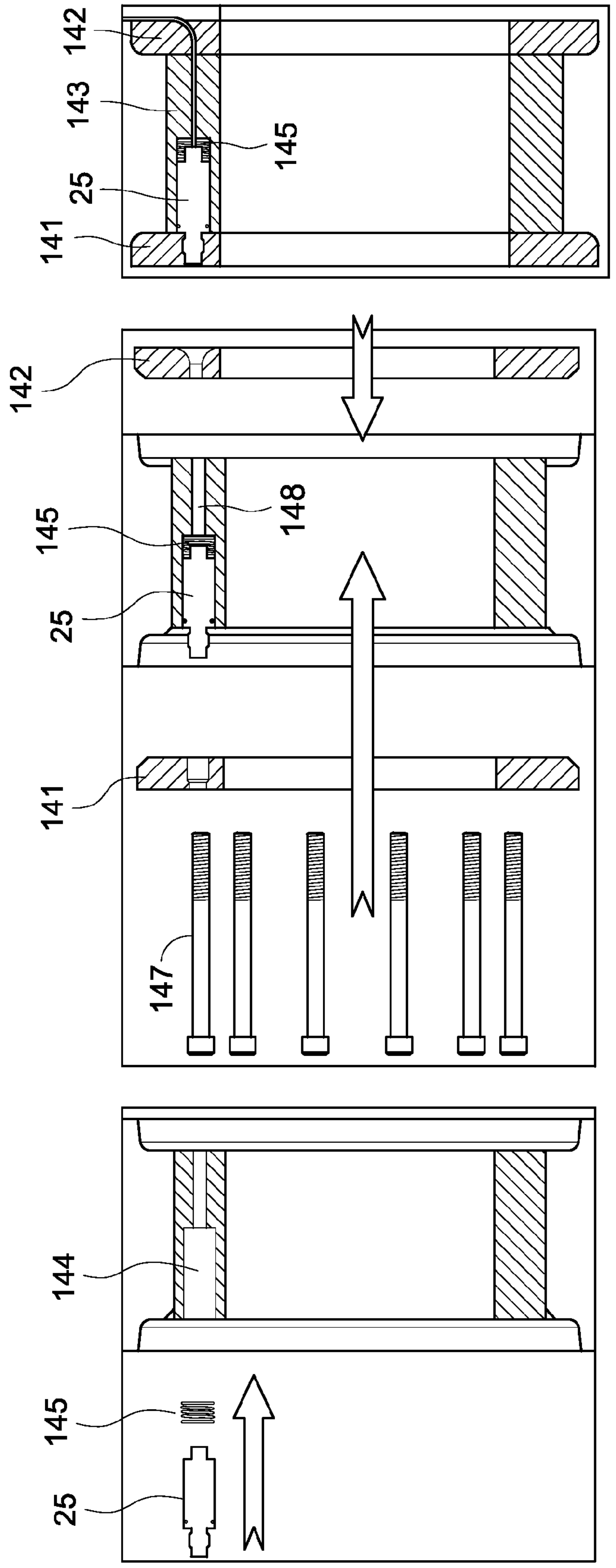
FIG. 23 is an exploded view of a probe holder for installation within the aft shaft plug of FIG. 22.
Figure 24:
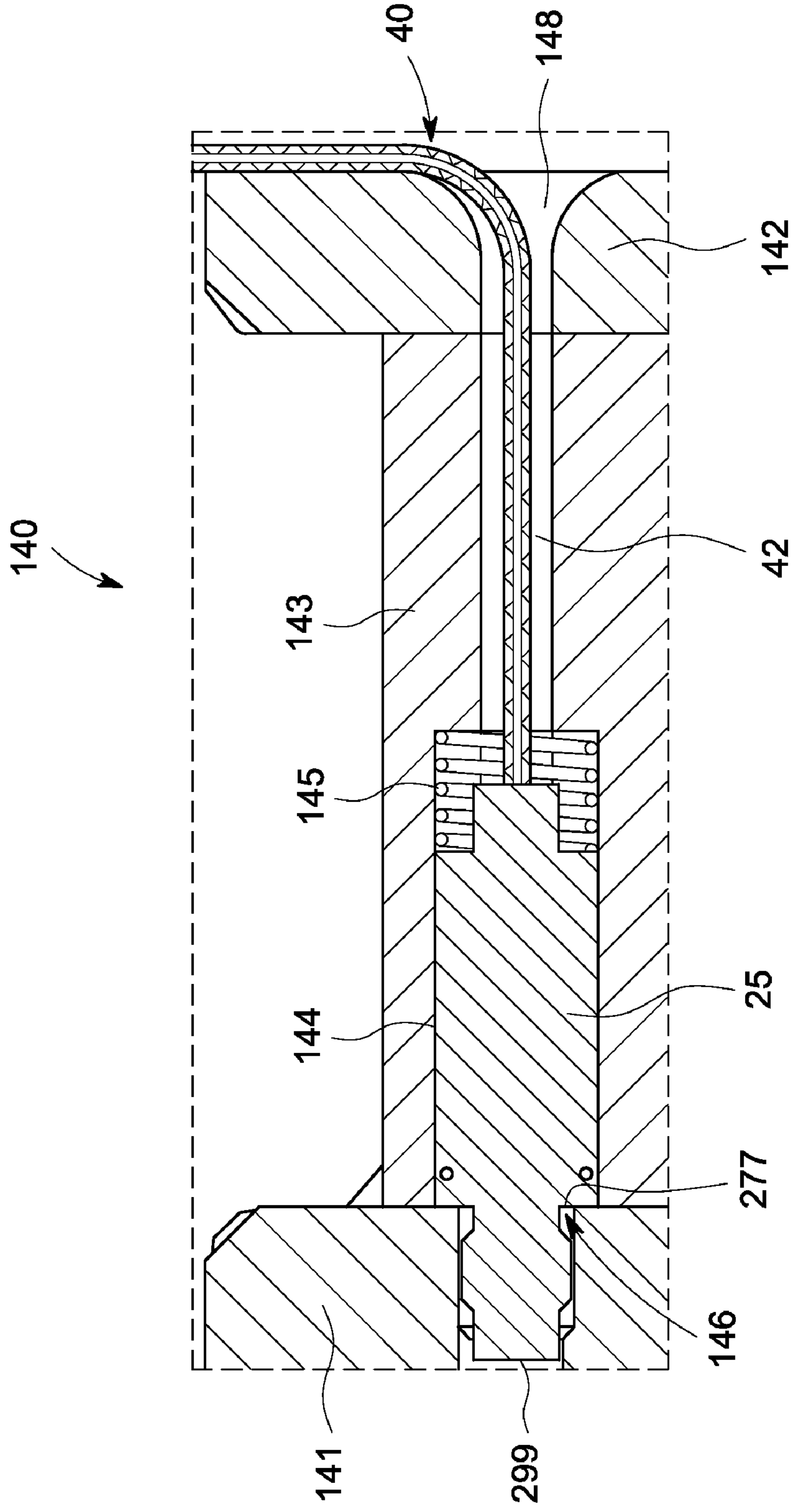
FIG. 24 is a side view of an interior of the probe holder of FIG. 23.

With reference to FIGS. 22-25, another point of measurement interest 20 is located at a region near an aft face of the aft shaft plug 17, which is formed perimetrically around the centerline 122. As shown in FIGS. 22 and 24, the probe holder 140 is formed to be insertible into a bore defined in the aft shaft plug 17. The probe holder 140 includes an aft cover plate 141 and a forward cover plate 142, which are provided on aft and forward sides of the bore, respectively, and a plug 143 sandwiched between the aft and forward cover plates 141 and 142, which are bolted together by axial bolts 147. The plug 143 and the aft cover plate 141 cooperatively define an aft shaft plug cavity 144 into which an elastic element 145, such as a compression spring, and the sensor 25 are disposable.

With the aft and forward cover plates 141 and 142 bolted together, the elastic element 145 urges the sensor 25 in the aft direction such that the sensing device 299 lines up with the aft face of the aft cover plate 141 and the aft face of the aft shaft plug 17. The elastic element 145 could be a compression spring or a machined spacer may alternatively be used. Aft cover plate shoulder portions 146 abut the shoulder portion 277 in opposition to the force applied by the elastic element 145. The plug 143 and the forward cover plate 142 cooperatively define a wiring hole 148 through which the portion 42 of the first wiring section 40 may be threaded and provided with strain relief in a similar manner as described above.

As shown in FIG. 23, the probe holder 140 is assembled by the sensor 25 and the elastic element 145 being inserted within the aft shaft plug cavity 144. Then, the aft cover plate 141 and the forward cover plate 142 are bolted with bolts 147 to one another on either side of the plug 143 thereby securing the sensor 25 in position. The portion 42 of the first wiring section 40 is then threaded through the wiring hole 148 in the forward direction and then radially outwardly along the forward face of the aft shaft plug 17.

Figure 25:
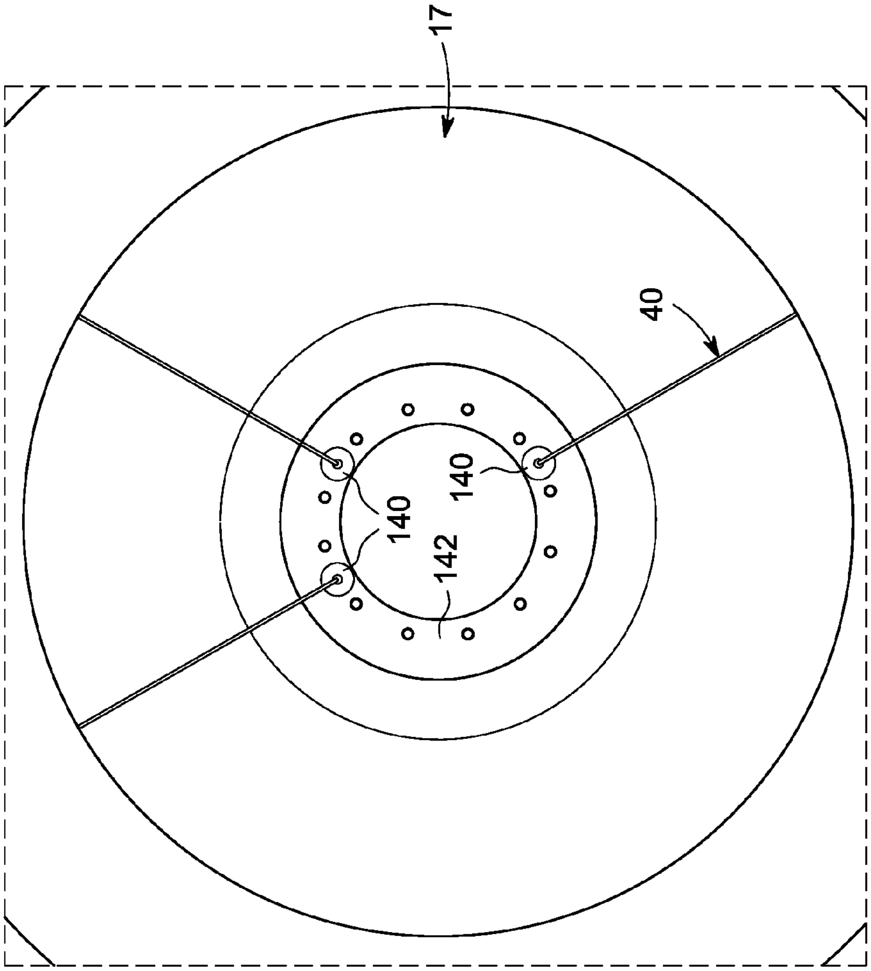
FIG. 25 is an axial view of wiring around the aft shaft plug.

As shown in FIG. 25, the first wiring section 40 is threaded radially outwardly along the forward cover plate 142 and the forward face of the aft shaft plug 17. In various embodiments, the aft shaft plug cavity 144 may be plural in number and uniformly and non-uniformly distributed about the centerline 122.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A sensor, comprising:

a body disposed at a point of measurement interest on a rotor at a radial distance from a centerline thereof and having a substantially cylindrical shape and first and second opposing ends; and a sensing end coupled to one of the first and second opposing ends, the other of the first and second opposing ends being coupled to a communication system, the sensing end including a sensing device configured to generate a signal reflective of a detected condition at the point of measurement interest, and at least one of the first and the second opposing ends being formed to define a shoulder portion for absorbing gravitational loading.

2. The sensor according to claim 1, wherein the body is formed to define wrench flats for calibration.

3. The sensor according to claim 1, wherein the sensing end comprises threading.

4. The sensor according to claim 1, wherein the sensing device comprises a pressure sensor to detect static and/or dynamic pressures at the point of measurement interest.

5. The sensor according to claim 1, wherein the sensing end protrudes from a face of the one of the first and second opposing ends.

6. The sensor according to claim 5, wherein the shoulder portion is defined at the face of the one of the first and second opposing ends remote from the sensing end.

7. A sensor, comprising:

a body disposed at a point of measurement interest on a rotor at a radial distance from a centerline thereof and having a substantially cylindrical shape and first and second opposing ends; and a sensing end coupled to one of the first and second opposing ends, the other of the first and second opposing ends being coupled to a communication system, the sensing end including a pressure sensor configured to generate a signal reflective of static and/or dynamic pressures at the point of measurement interest, and at least one of the first and the second opposing ends being formed to define a shoulder portion for absorbing gravitational loading.

8. The sensor according to claim 7, wherein the body is formed to define wrench flats for calibration.

9. The sensor according to claim 7, wherein the sensing end comprises threading.

10. The sensor according to claim 7, wherein the pressure sensor comprises a sensing device.

11. The sensor according to claim 7, wherein the sensing end protrudes from a face of the one of the first and second opposing ends.

12. The sensor according to claim 11, wherein the shoulder portion is defined at the face of the one of the first and second opposing ends remote from the sensing end.

13. A pressure sensor, comprising:

a body disposed at a point of measurement interest on a rotor at a radial distance from a centerline thereof and having a substantially cylindrical shape and first and second opposing ends; and a sensing end coupled to one of the first and second opposing ends, the other of the first and second opposing ends being coupled to a communication system, the sensing end including a sensing device configured to generate a signal reflective of detected static and/or dynamic pressures applied thereto, and at least one of the first and the second opposing ends being formed to define a shoulder portion for absorbing gravitational loading associated with rotor rotation about the centerline.

14. The pressure sensor according to claim 13, wherein the body is formed to define wrench flats for calibration.

15. The pressure sensor according to claim 13, wherein the sensing end comprises threading.

16. The sensor according to claim 13, wherein the sensing end protrudes from a face of the one of the first and second opposing ends.

17. The sensor according to claim 16, wherein the shoulder portion is defined at the face of the one of the first and second opposing ends remote from the sensing end.

* * * * *